United States Patent
True

(10) Patent No.: US 9,989,368 B2
(45) Date of Patent: Jun. 5, 2018

(54) IDENTIFYING CLOSED ROADS AND ROUTES

(71) Applicant: International Business Machines Corporation, Armonk, NY (US)

(72) Inventor: Joseph A. True, Hudson, MA (US)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 15/155,028

(22) Filed: May 15, 2016

(65) Prior Publication Data

US 2017/0328723 A1 Nov. 16, 2017

(51) Int. Cl.
*G01C 21/34* (2006.01)
*H04W 4/02* (2018.01)
*H04W 88/02* (2009.01)

(52) U.S. Cl.
CPC ............ *G01C 21/34* (2013.01); *H04W 4/023* (2013.01); *H04W 88/02* (2013.01)

(58) Field of Classification Search
CPC ....... G01C 21/34; H04W 4/023; H04W 88/02
See application file for complete search history.

(56) References Cited

U.S. PATENT DOCUMENTS

| | | |
|---|---|---|
| 5,020,143 A | 5/1991 | Duckeck et al. |
| 5,184,303 A | 2/1993 | Link |
| 5,504,482 A | 4/1996 | Schreder |
| 5,787,383 A | 7/1998 | Moroto et al. |
| 6,118,389 A | 9/2000 | Kamada et al. |
| 6,687,615 B1 | 2/2004 | Krull et al. |
| 6,761,205 B1* | 7/2004 | Atherton .................. E06B 3/80 160/188 |
| 7,590,490 B2 | 9/2009 | Clark |
| 9,208,684 B2* | 12/2015 | Lee .................. G08G 1/096725 |
| 2004/0034467 A1* | 2/2004 | Sampedro .......... G01C 21/3492 701/533 |
| 2007/0156336 A1 | 7/2007 | Chang et al. |
| 2007/0162223 A1 | 7/2007 | Clark |
| 2008/0275629 A1* | 11/2008 | Yun .................... G01C 21/3492 701/118 |

(Continued)

FOREIGN PATENT DOCUMENTS

| | | |
|---|---|---|
| CN | 203351048 U | 12/2013 |
| DE | 4301875 C2 | 9/2001 |

OTHER PUBLICATIONS

"All Road Mate Series: Magellan RoadMate 1700-MU", Magellan, http://www.magellangps.com/Store/RoadMate/Magellan-RoadMate-1700-MU, [Retrieved May 10, 2016].

(Continued)

*Primary Examiner* — Mary D Cheung
(74) *Attorney, Agent, or Firm* — North Shore Patents, P.C.; Joseph L. Acayan

(57) ABSTRACT

A set of smart devices includes a first smart device physically placed at a first geolocation and a second smart device physically placed at a second geolocation. The first and second smart devices obtain their first and second current geolocations. The first smart device sends the first current geolocation and a first roadway status information indicating a start of the roadway to a mapping service over a wireless communications network, and the second smart device also sends the second current geolocation and a second roadway status information indicating an end of the roadway to the mapping service. The first and second roadway status information may further indicates that the roadway defined by the first and second current geolocations is a closed roadway or a detour. The mapping service may calculate routes based on the first and second geolocations and the first and second roadway status information.

20 Claims, 3 Drawing Sheets

(56) References Cited

U.S. PATENT DOCUMENTS

| | | |
|---|---|---|
| 2009/0265092 A1 | 10/2009 | Lin |
| 2010/0082232 A1* | 4/2010 | Lee .................. G01C 21/3667 |
| | | 701/533 |
| 2010/0256903 A1 | 10/2010 | Johnson |
| 2011/0098915 A1 | 4/2011 | Disatnik et al. |
| 2011/0238304 A1* | 9/2011 | Kendall ............. G01C 21/3415 |
| | | 701/532 |
| 2012/0290150 A1 | 11/2012 | Doughty et al. |
| 2013/0035978 A1* | 2/2013 | Richardson .......... G06Q 10/087 |
| | | 705/7.27 |
| 2013/0103313 A1 | 4/2013 | Moore et al. |
| 2013/0325317 A1 | 12/2013 | Pylappan et al. |
| 2014/0129143 A1 | 5/2014 | Dave et al. |
| 2015/0285652 A1 | 10/2015 | Peri et al. |

OTHER PUBLICATIONS

"Road Closures/Detours", Smart Park Inc., http://www.smartpark.com/travel-info/road-closures-detours/, [Retrieved on May 10, 2016].

"Self-aware and Self-healing networks", Telvent, http://www.apta.com/mc/fctt/previous/2012/ttpresentations/Presentations/Session-6-Self-Aware-and-Self-healing-Systems-Jorgen-Pedersen.pdf, [Retrieved May 10, 2016].

"SMART Corridor FAQs", SMART Corridor, http://www.dot.ca.gov/dist4/projects/80icm/docs/i80_icm_faqs_fall_2015.pdf, Fall 2015 [Retrieved May 10, 2016].

"Traveler Information Management System", North Carolina Department of Transportation, http://www.ncdot.gov/trafficktravel/, [Retrieved May 10, 2016].

Calderone, Len, "Communicating Cars the Future?", Robotics Tomorrow, retrieved from http://www.roboticstomorrow.com/article/2015/02/communicating-cars-the-future/5449/, Feb. 13, 2015.

IBM, "Adaptive 'Verbosity mode' to enhance usabiltiy of the common place GPS devices", IP.com No. IPCOM000171199D, Jun. 2, 2008.

Linux Defenders, Viva Miller, "[VL100] GPS Corrector", IP.com No. IPCOM000201142D, Nov. 9, 2010.

Motorola, Sa'ed A'rafat, "Partial Road Closures (Point Closures)", IP.com No. IPCOM000159656D, Oct. 23, 2007.

\* cited by examiner

IDENTIFYING CLOSED ROADS AND ROUTES

BACKGROUND

Mapping applications exist to provide users with roadway routes between various locations. Some of these mapping applications calculate alternative routes or detours to reflect roadway and traffic conditions. Some leverage information from crowdsources and social media to gather information which are then used to calculate the alternative routes. However, existing mapping applications struggle to provide the alternative routes on a timely basis. Crowdsources and social media may provide some close-in-time information but rely on users being present or to witness the roadway or traffic conditions and to manually share such information.

SUMMARY

Disclosed herein is a method for identifying road status information, a computer program product, and a system as specified in the independent claims. Embodiments of the present invention are given in the dependent claims. Embodiments of the present invention can be freely combined with each other if they are not mutually exclusive.

A set of smart devices includes a first smart device physically placed at a first geolocation and a second smart device physically placed at a second geolocation. In a method for identifying roadway status information, the first smart device obtains a first current geolocation of the first smart device, and a second smart device obtains a second current geolocation of the second smart device. The first smart device sends the first current geolocation and a first roadway status information indicating a start of the roadway to a mapping service over a wireless communications network. The second smart device sends the second current geolocation and a second roadway status information indicating an end of the roadway to the mapping service over the wireless communications network.

In one aspect of the present invention, the first roadway status information and the second roadway status information further indicates that the roadway defined by the first current geolocation and the second current geolocation is a closed roadway.

In one aspect of the present invention, the first roadway status information and the second roadway status information further indicates that the roadway defined by the first current geolocation and the second current geolocation is a detour.

In one aspect of the present invention, the mapping service calculates routes based on the first and second geolocations and the first and second roadway status information.

DETAILED DESCRIPTION

Figure 1:
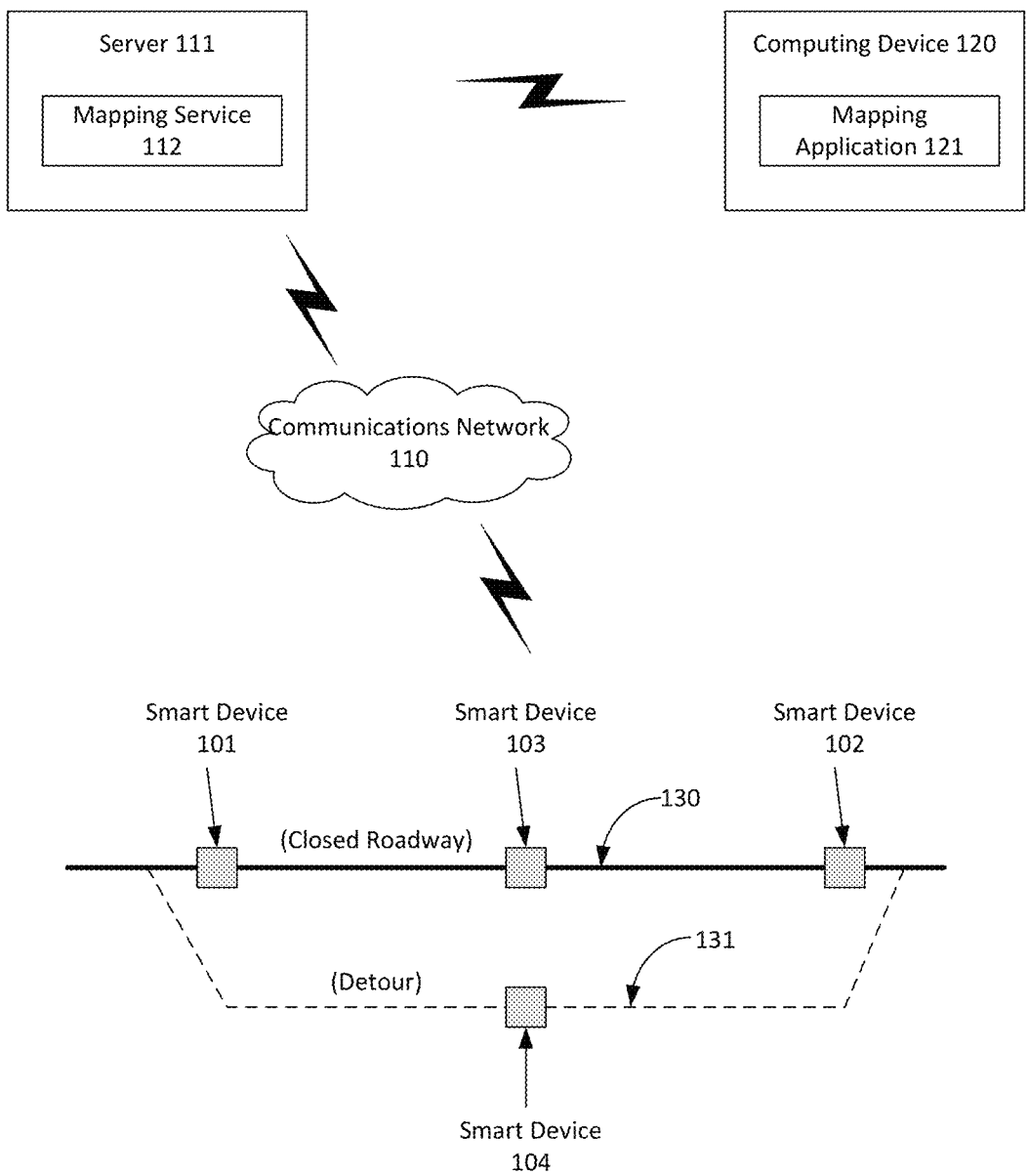
FIG. 1 is a block diagram of a system for identifying roadway status information according to embodiments of the present invention.

FIG. 1 is a block diagram of a system for identifying roadway status information according to embodiments of the present invention. The system includes a set of smart devices 101-102 physically placed at points along a roadway. Each smart device 101-102 includes the ability to obtain its geolocation and to communicate over a wireless communications network 110 with a mapping service 112 on a server 111. The set of smart devices 101-102 include a first smart device 101 indicating a starting geolocation of a roadway and a second smart device 102 indicating an ending geolocation of the roadway. The roadway defined by the starting and ending geolocations may be a closed roadway 130 or a detour 131. The set of smart devices may further include one or more additional smart devices 103 physically placed along the roadway to indicate an in-between geolocation of the roadway, where the smart devices 101-103 define a closed roadway 130. Alternatively, or in addition, other smart device(s) 104 may be physically placed along another roadway, indicating a middle geolocation of the other roadway, where the smart devices 101, 102 and 104 define a detour 131. Each of the smart devices 101-104 can send its current geolocation and roadway status information to the mapping service 112 over the communications network 110. The mapping service 112 can then use the information received from the smart devices 101-104 to calculate routes. The routes can then be sent to mapping applications 121 on one or more computing devices 120. The mapping service may also use the provided geolocations and information to send informational updates, status, or warnings to the mapping application to display as information to the users of the mapping application.

Figure 3:
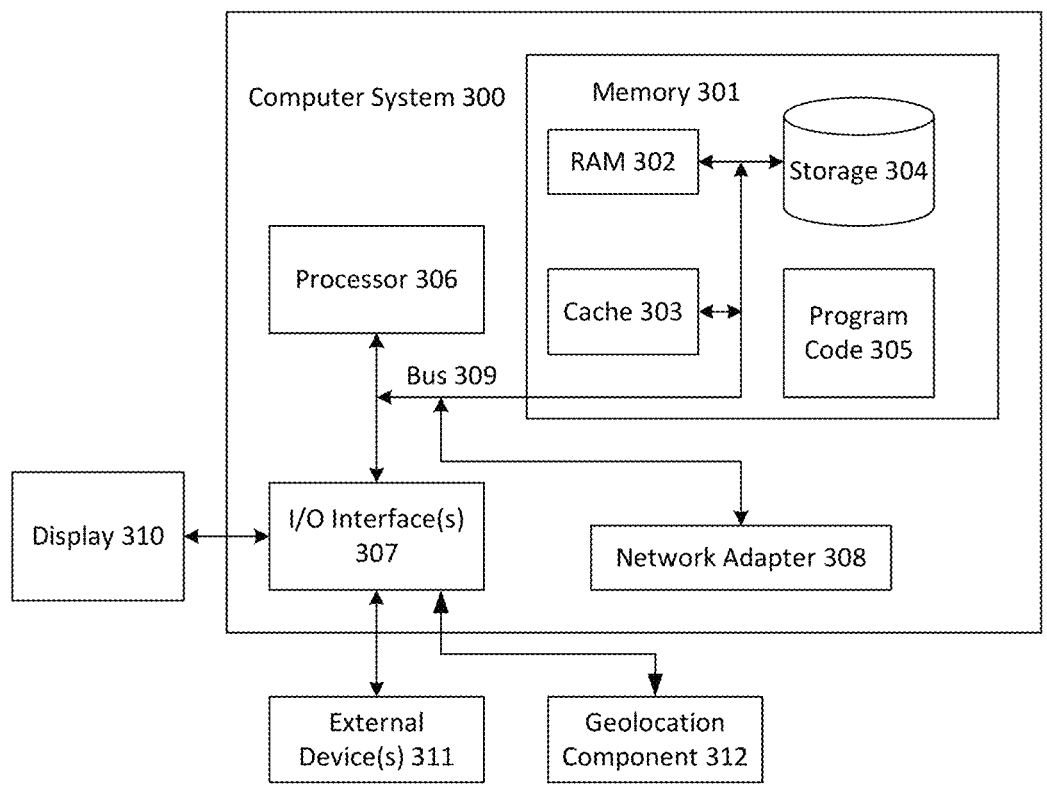
FIG. 3 is a block diagram of a computer system for identifying roadway status information according to embodiments of the present invention.

Each smart device 101-104 comprise a computer system 300 according to embodiments of the present invention, as illustrated in FIG. 3. The computer system 300 is operationally coupled to a processor or processing units 306, a memory 301, and a bus 309 that couples various system components, including the memory 301 to the processor 306. The bus 309 represents one or more of any of several types of bus structure, including a memory bus or memory controller, a peripheral bus, an accelerated graphics port, and a processor or local bus using any of a variety of bus architectures. The memory 301 may include computer readable media in the form of volatile memory, such as random access memory (RAM) 302 or cache memory 303, or non-volatile storage media 304. The memory 301 may include at least one program product having a set of at least one program code module 305 that are configured to carry out the functions of embodiment of the present invention when executed by the processor 306. The computer system 300 may also communicate with one or more external devices 311, such as a display 310 and a geolocation component 312, via I/O interfaces 307. In one illustrative embodiment, the geolocation component 312 is a global positioning system (GPS). Other types of location components may be used to obtain or derive the geolocation of the computer system 300. The computer system 300 may communicate with one or more networks, such as communications network 110, via network adapter 308. The computing device 120 may also comprise many if not all of the components of the computer system 300.

Figure 2:
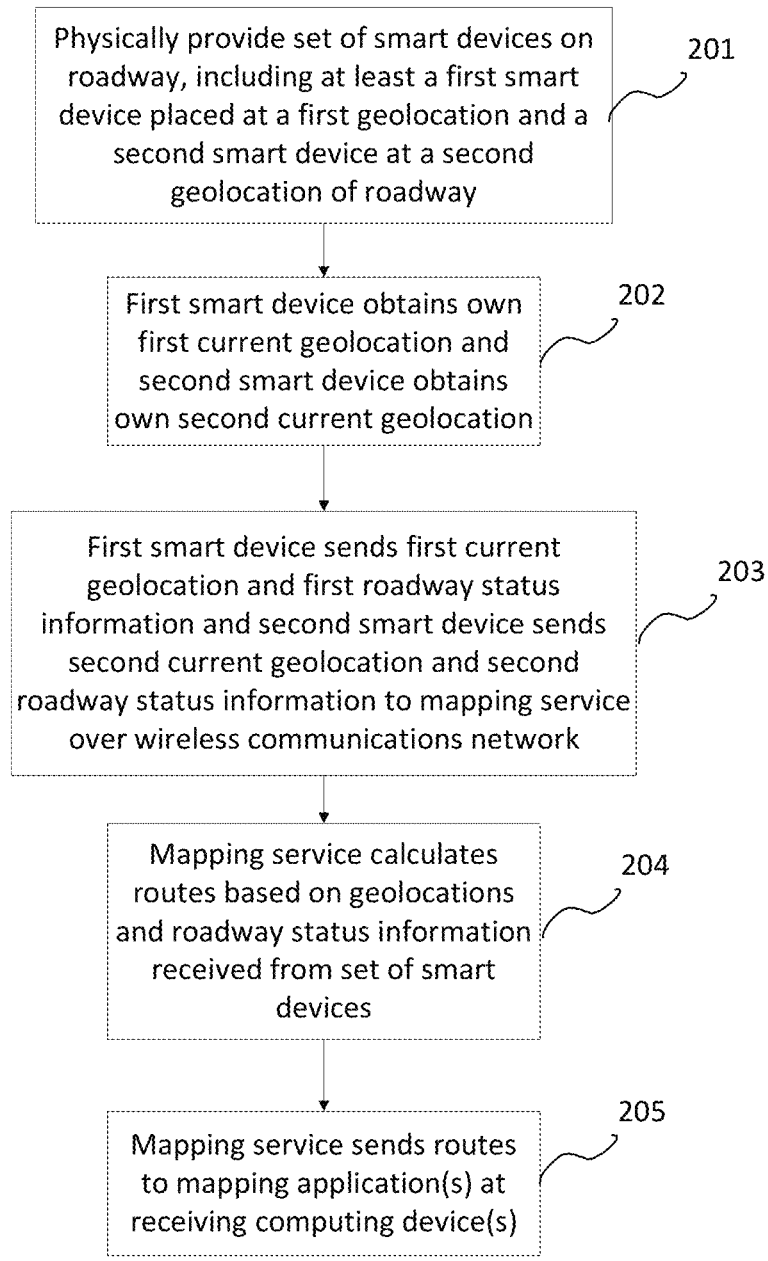
FIG. 2 is a flowchart illustrating a method for identifying roadway status information according to embodiments of the present invention.

FIG. 2 is a flowchart illustrating a method for identifying roadway status information according to embodiments of the present invention. A set of smart devices 101-102 are physically provided on a roadway, including at least a first smart device 101 placed at a first geolocation and a second smart device 102 placed at a second geolocation of the roadway (201). When activated, the first smart device 101 obtains its own first current geolocation, and the second smart device 102 obtains its own second current geolocation (202). The first smart device 101 automatically, without further user intervention, sends the first current geolocation and a first roadway status information indicating a start of a roadway, and the second smart device 102 automatically, without further user intervention, sends the second current geolocation and a second roadway status information indicating an end of the roadway, to the mapping service 112 over a wireless communications network 110 (203). In this illustrative embodiment, each smart device 101-102 obtains its current geolocation via its geolocation component 312. For example, assuming the geolocation component 312 is a GPS, each smart device 101-102 would communicate with a GPS satellite (not shown) to obtain the coordinates (e.g. latitude and longitude) for its current position. The first and second roadway status information each further indicates whether the roadway defined by the current geolocations of the smart devices 101-102 is a closed roadway and/or a detour. In other illustrative embodiments, the roadway status information may indicate that the defined roadway has an obstruction on or near the defined roadway, has activity on or near the defined roadway, time period(s) during which the roadway status is active, a particular lane(s) of a multi-lane road that is closed or has an obstruction, and/or a particular direction of a multi-directional road that is closed or has an obstruction. Other types of roadway status may also be configured. The roadway status may be input into the smart detour devices 101-120 manually by a user or pre-configured using default parameters. The mapping service 112 interprets the received geolocations and status information. Based on this information, the mapping service 112 calculates routes (204) and sends the routes to mapping application(s) 121 at receiving computing device(s) 120 (205). The mapping service may also use the provided geolocations and information to send informational updates, status, or warnings to the mapping application to display as information to the users of the mapping application.

In an illustrative embodiment, the set of smart devices 101-104 define both a closed road and a detour. Here, the first smart device 101 sends its current geolocation and roadway status information indicating a starting geolocation for both a closed roadway and a detour. The second smart device 102 sends its current geolocation and roadway status information indicating an ending geolocation for both the closed roadway and the detour. The third smart device 103 sends its current geolocation and roadway status information indicating a geolocation for the closed roadway only, and the fourth smart device 104 sends its current geolocation and roadway status information indicating a geolocation for the detour only. The mapping service 112 receives the geolocations and roadway status information from the set of smart devices 101-104. Using this information, the mapping service 112 calculates routes to account for the closed road and the detour.

In an illustrative embodiment, the set of smart devices 101-102 automatically, without user intervention, sends updated geolocations and roadway status information to the mapping service 112 periodically. The length of the time period may be a configurable parameter. Optionally, any given smart device 101-104 can detect when its geolocation has changed, such as by comparing its current GPS coordinate with its previous GPS coordinate. Upon determining that its geolocation has changed, the given smart device 101-104 sends an update of its geolocation, and any updates to the roadway status information, to the mapping service 112. For example, assume that a set of smart devices 101-102 are coupled to signs or barriers during a construction or road repair project, where a segment of a roadway is closed at a time. The smart devices 101-102 send their current geolocations and the closed status of the roadway segment to the mapping service 112, in the manner described above. As each segment of the roadway is repaired, it is reopened to traffic, and the next segment of the roadway is closed. When the signs or barriers are moved to close the next roadway segment, the smart devices 101-102 detect that their geolocations have changed, and in response, sends updated geolocations and updates to the roadway status information to the mapping service 112. Other metadata may also be sent, such as the unique identifiers for each smart detour device 101-102. The mapping service 112 interprets the change in the current geolocations and the other updated information it receives from the smart devices 101-102 to understand that the roadway segment previously defined by the same smart devices 101-102 is no longer closed and that the newly defined roadway segment is currently closed.

In other illustrative embodiments, smart devices 101-102 may be coupled to emergency service vehicles, such as fire engines, police vehicles, ambulances, tow trucks, etc. A set of smart devices 101-102 may be activated to communicate roadway status during fires, roadway accidents, police actions, medical emergencies, roadside activities, and any other activities that would require road or lane closures.

Optionally, a smart device may receive from the mapping service 112 its interpretation of the geolocation and roadway status on the smart device's display 310. The smart device may prompt the user, via the display 310, to confirm or correct the mapping service's interpretation.

Optionally, one of the set of smart devices may broadcast status information, either via the mapping service 112 or directly to other devices, concerning a route defined by the other smart devices in the set. The broadcast of the status information may be in additional to or instead of sending information used by the mapping service 112 to determine the route.

Embodiments of the present invention for identifying road status information has been disclosed. In the illustrated embodiments, the present invention does not rely upon crowdsources, social media, or user input to obtain real-time information concerning the road closures or detours. The smart detour devices of the present invention are able to automatically, i.e., without user intervention, send real-time information to a mapping service 112.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying roadway status information, comprising:

obtaining a first current geolocation of a first smart device by the first smart device, obtaining a second current geolocation of a second smart device by the second smart device, and obtaining a third current geolocation of a third smart device by the third smart device, wherein a set of smart devices comprises at least the first smart device physically placed at a first geolocation of the roadway, the second smart device physically placed at a second geolocation of the roadway, and the third smart device physically placed at a third geolocation of the roadway, wherein the third geolocation is in between the first geolocation and the second geolocation;

sending the first current geolocation and a first roadway status information by the first smart device to a mapping service over a wireless communications network, wherein the first current geolocation and a first roadway status information indicate a start of the roadway; and sending the second current geolocation and a second roadway status information by the second smart device to the mapping service over the wireless communications network, wherein the second current geolocation and a second roadway status information indicate an end of the roadway; and sending the third current geolocation and a third roadway status information by the third smart device to the mapping service over the wireless communications network, wherein the third roadway status information indicates an in-between geolocation of the roadway.

2. The method of claim 1, wherein the first roadway status information, the second roadway status information, and the third roadway status information further indicates that the roadway defined by the first current geolocation and the second current geolocation is a closed roadway.

3. The method of claim 1, wherein the first roadway status information and the second roadway status information, and the third roadway status information further indicates that the roadway defined by the first current geolocation and the second current geolocation is a detour.

4. The method of claim 1, wherein the mapping service calculates routes based on the first and second geolocations and the first and second roadway status information.

5. The method of claim 1, wherein the first roadway status information, the second roadway status information, and the third roadway status information further indicate that the roadway has an obstruction on or near the roadway.

6. The method of claim 1, further comprising:
   detecting, by the first or second smart device, a change in the first or second current geolocations; and
   in response to detecting the change, sending an update to the mapping service over the wireless communications network, the update comprising a new current geolocation of the first or second smart device and any updated first or second roadway status information.

7. The method of claim 6, wherein the detecting of the change in the first or second current geolocations and the sending of the update comprises:
   obtaining, by the first or second smart device, an updated geolocation;
   comparing the updated geolocation with the first or second current geolocations; and
   in response to determining that the updated geolocation is different from the first or second current geolocations, sending the update to the mapping service over the wireless communications network.

8. A computer program product for identifying roadway status information, the computer program product comprising at least one computer readable storage medium having program instructions embodied therewith, the program instructions executable by at least one processor to cause the at least one processor to:
   obtain a first current geolocation of a first smart device by the first smart device, obtain a second current geolocation of a second smart device by the second smart device, and obtaining a third current geolocation of a third smart device by the third smart device, wherein a set of smart devices comprises at least the first smart device physically placed at a first geolocation of the roadway, the second smart device physically placed at a second geolocation of the roadway, and the third smart device physically placed at a third geolocation of the roadway, wherein the third geolocation is in between the first geolocation and the second geolocation;

send the first current geolocation and a first roadway status information by the first smart device to a mapping service over a wireless communications network, wherein the first current geolocation and a first roadway status information indicate a start of the roadway; and send the second current geolocation and a second roadway status information by the second smart device to the mapping service over the wireless communications network, wherein the second current geolocation and a second roadway status information indicate an end of the roadway; and sending the third current geolocation and a third roadway status information by the third smart device to the mapping service over the wireless communications network, wherein the third roadway status information indicates an in-between geolocation of the roadway.

9. The computer program product of claim 8, wherein the first roadway status information, the second roadway status information, and the third roadway status information further indicates that the roadway defined by the first current geolocation and the second current geolocation is a closed roadway.

10. The computer program product of claim 8, wherein the first roadway status information and the second roadway status information, and the third roadway status information further indicates that the roadway defined by the first current geolocation and the second current geolocation is a detour.

11. The computer program product of claim 8, wherein the mapping service calculates routes based on the first and second geolocations and the first and second roadway status information.

12. The computer program product of claim 8, wherein the first roadway status information, the second roadway status information, and the third roadway status information further indicate that the roadway has an obstruction on or near the roadway.

13. The computer program product of claim 8, wherein the at least one processor further:
   detects, by the first or second smart device, a change in the first or second current geolocations; and
   in response to detecting the change, sends an update to the mapping service over the wireless communications network, the update comprising a new current geolocation of the first or second smart device and any updated first or second roadway status information.

14. The computer program product of claim 13, wherein the detecting of the change in the first or second current geolocations and the sending of the update comprises:
   obtains, by the first or second smart device, an updated geolocation;
   compares the updated geolocation with the first or second current geolocations; and
   in response to determining that the updated geolocation is different from the first or second current geolocations, sends the update to the mapping service over the wireless communications network.

15. A system comprising:
   a first smart device physically placed at a first geolocation of a roadway, the first smart device comprising a first processor and a first computer readable storage medium having program instructions embodied therewith, the program instructions executable by the first processor to cause the first smart device to:

obtain a first current geolocation of the first smart device; and send the first current geolocation and a first roadway status information indicating a start of the roadway to a mapping service over a wireless communications network; and a second smart device physically placed at a second geolocation of the roadway, the second smart device comprising a second processor and a second computer readable storage medium having program instructions embodied therewith, the program instructions executable by the second processor to cause the second smart device to:

obtain a second current geolocation of the second smart device; and send the second current geolocation and a second roadway status information indicating an end of the roadway to the mapping service over the wireless communications network a third smart device physically placed at a third geolocation of the roadway, wherein the third geolocation is in between the first geolocation and the second geolocation, the third smart device comprising a third processor and a third computer readable storage medium having program instructions embodied therewith, the program instructions executable by the third processor to cause the third smart device to:

obtain a third current geolocation of the third smart device; and send the third current geolocation and a third roadway status information indicating an in-between geolocation of the roadway to the mapping service over the wireless communications network.

16. The system of claim 15, wherein the first roadway status information, the second roadway status information, and the third roadway status information further indicates that the roadway defined by the first current geolocation and the second current geolocation is a closed roadway.

17. The system of claim 15, wherein the first roadway status information, the second roadway status information, and the third roadway status information further indicates that the roadway defined by the first current geolocation and the second current geolocation is a detour.

18. The system of claim 15, further comprising a third smart device physically placed in a third geolocation of the roadway and between the first and second geolocations, the third smart device comprising a third processor and a third computer readable storage medium having program instructions embodied therewith, the program instructions executable by the third processor to cause the third smart device to:

obtain a third current geolocation of the third smart device; and send the third current geolocation and a third roadway status information indicating an in-between geolocation of the roadway to the mapping service over the wireless communications network.

19. The system of claim 15, wherein the first or second smart device further:

detects a change in the first or second current geolocations; and in response to detecting the change, sends an update to the mapping service over the wireless communications network, the update comprising a new current geolocation of the first or second smart device and any updated first or second roadway status information.

20. The system of claim 19, wherein the detecting of the change in the first or second current geolocations and the sending of the update comprises:

obtains an updated geolocation;

compares the updated geolocation with the first or second current geolocations; and in response to determining that the updated geolocation is different from the first or second current geolocations, sends the update to the mapping service over the wireless communications network.

\* \* \* \* \*